United States Patent [19]

Galbraith

[11] 4,424,726

[45] Jan. 10, 1984

[54] VARIABLE SPEED EPICYCLIC TRANSMISSION DEVICES

[75] Inventor: Peter A. Galbraith, West Midland, Australia

[73] Assignee: Galbraith Engineering Pty. Ltd., West Midland, Australia

[21] Appl. No.: 201,671

[22] Filed: Oct. 28, 1980

Related U.S. Application Data

[63] Continuation of Ser. No. 856,009, Nov. 30, 1977, abandoned.

[30] Foreign Application Priority Data

Dec. 16, 1976 [AU] Australia ............................. 8521/76

[51] Int. Cl.³ ............................................. F16H 15/50
[52] U.S. Cl. ....................................... 74/796; 74/199
[58] Field of Search ............... 74/196, 199, 207, 208, 74/209, 216, 337, 752 B, 752 F, 796, 690

[56] References Cited

U.S. PATENT DOCUMENTS 1,813,957  7/1931  Robertson ............................ 74/199
2,132,801 10/1938  Perruca ................................ 74/208
2,826,935  3/1958  Beier .................................... 74/796
2,973,671  3/1961  Elkins ................................... 74/796
3,043,150  7/1962  Skuba ................................... 74/216
3,241,382  3/1966  Temple ................................. 74/209
3,530,732  9/1970  Kashihara ............................. 74/796
3,990,328 11/1976  Galbraith .............................. 74/796

Primary Examiner—Kenneth Dorner

[57] ABSTRACT

An improved infinitely variable speed epicyclic drive mechanism having planet discs which are supported by a carrier and revolve on a track determined by a pair of sun discs and matching non-rotating peripheral annular members. In one embodiment, the planet discs are each rotatable in an arm or fork in turn rotatable in the carrier and means is provided to reduce centrifugally induced axial forces occuring between the planet discs and the surrounding annular members. In a further embodiment the sun discs are torque sensitively loaded towards each other for frictionally engaging the planet discs by helical gears in an epicyclic gear train to which the mechanism is coupled.

4 Claims, 8 Drawing Figures

VARIABLE SPEED EPICYCLIC TRANSMISSION DEVICES

This is a continuation of application Ser. No. 856,009 filed Nov. 30, 1977, now abandoned.

This invention relates to an infinitely variable speed epicyclic drive mechanism of the kind comprising a pair of sun discs mounted on a shaft for rotation therewith, at least one of said discs being capable of limited axial movement along the shaft and being, at least when the drive mechanism is in operation, loaded towards the other disc; a plurality of planet discs carried by a carrier member which is in turn mounted for rotation about an axis coaxial with the axis of rotation of said shaft, the planet discs being individually rotatable about a respective axis substantially parallel to said first shaft and being movable, on said rotation of the carrier member, in a plane normal to the axis of said shaft; a pair of spaced non-rotating annular members substantially coplanar with and concentric with said sun discs, the inner periphery of said annular members and the outer periphery of said sun discs embracing and frictionally engaging said planet discs at least when the drive mechanism is in operation; and means operable to vary or allow variation of the radial position of said planet discs with respect to said annular members and said sun discs. Such drive mechanisms are hereinafter referred to as being of the kind described.

One form of drive mechanism of the kind described is disclosed and claimed is the present applicant's prior Australian patent specification No. 469,909. In that case, the planet discs are supported on the carrier member by being each rotatably mounted on one end of a corresponding arm or fork the other end of which is pivotally mounted on the carrier member for movement about an axis substantially parallel to the shaft mounting the sun discs.

It has now been realized that the performance of this arrangement can be enhanced, especially at high output (or, more specifically, high planet disc carrier) speeds by further providing means for reducing, at least at carrier speeds above a given value, centrifugally induced axial forces occurring between the planet discs and annular members.

The force reducing means is advantageously afforded by counterbalancing the centrifugal forces. Such may be achieved by providing respective counterweights on the arms or forks or, alternatively, respective springs acting between the carrier member and the arms or forks.

As mentioned, drive mechanisms of the kind described include a pair of sun discs axially loaded towards each other. This can be achieved by way of shaft embracing helical compression springs and the aforementioned patent specification 469,909 suggests the provision of a torque sensitive axial loading device. In a second aspect of this invention, there is provided a particularly advantageous arrangement affording such torque sensitive axial loading of the sun discs. More particularly, the drive mechanism is coupled to an epicyclic gear train and said loading of one of the sun discs towards the other is achieved by way of helical gears in the gear train to provide a torque sensitive axial loading on the respective sun disc.

The invention will now be described in greater detail by way of example only with reference to the accompanying drawings, in which:

FIG. 1 is an axial cross-sectional view of one embodiment of coupled epicyclic drive and gear mechanisms incorporating certain features in accordance with both aspects of the invention;

FIGS. 2 and 3 are respective cross-sections on the lines 2—2 and 3—3 in FIG. 1;

Figure 1:
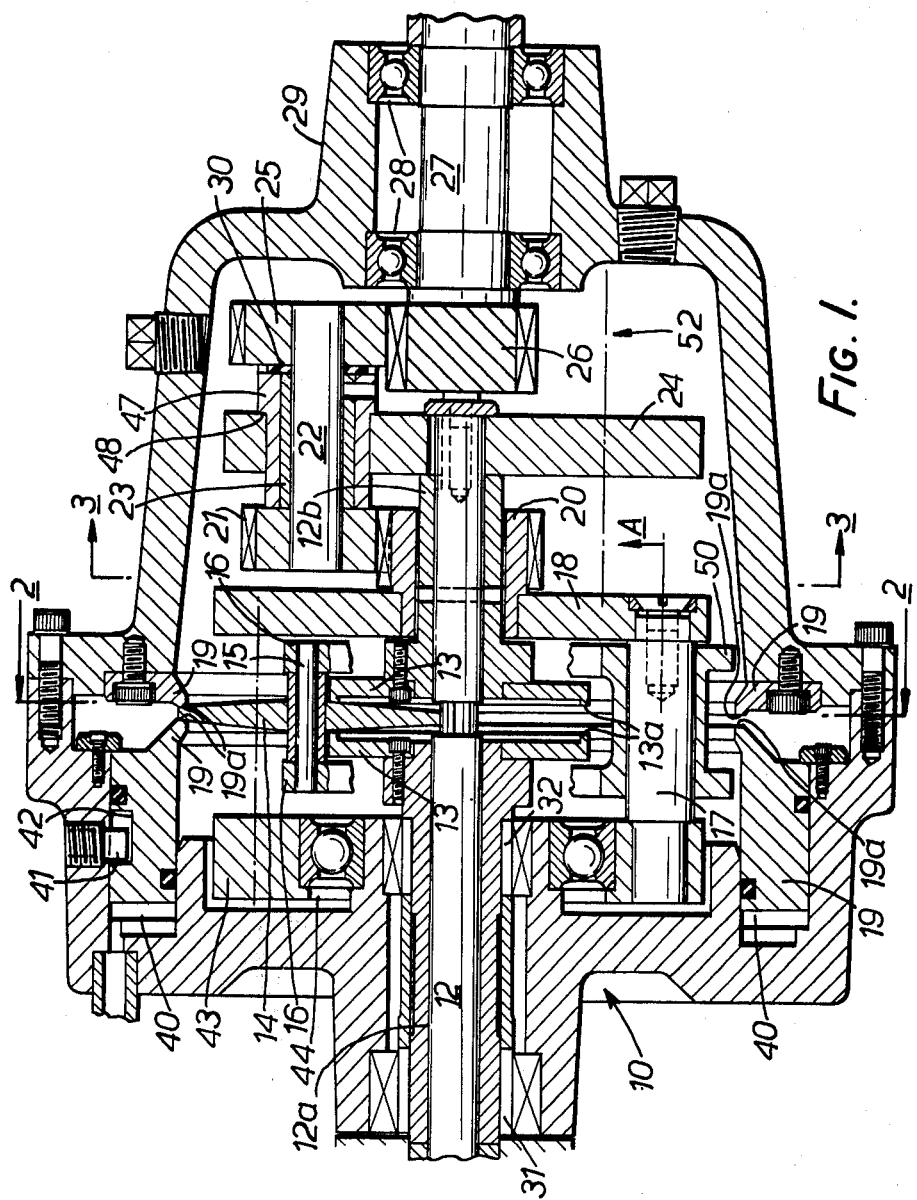
Figure 2:
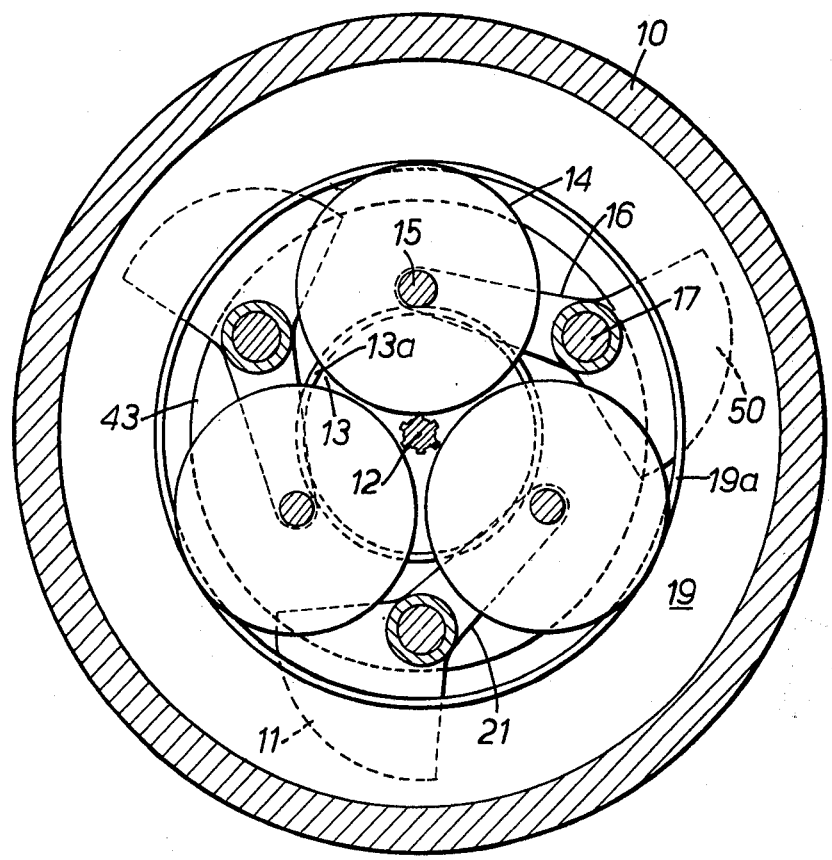
Figure 3:
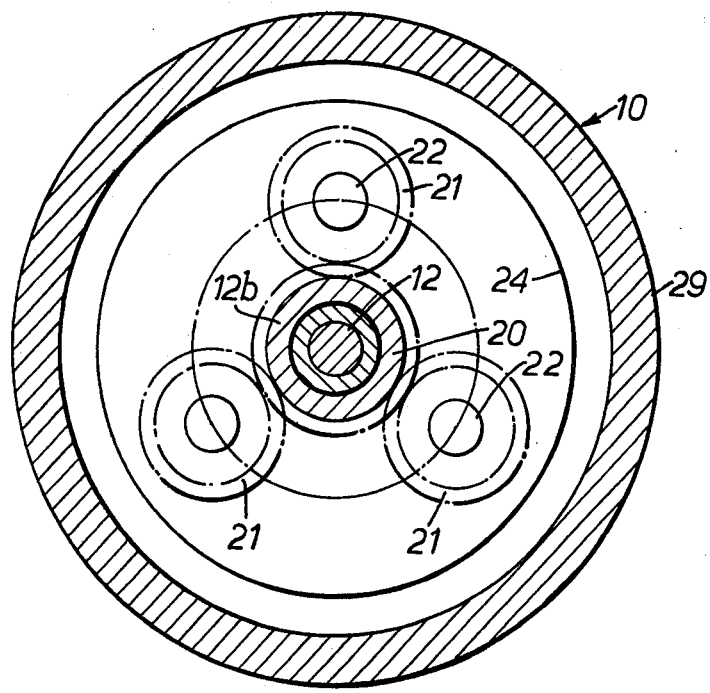
Figure 4:
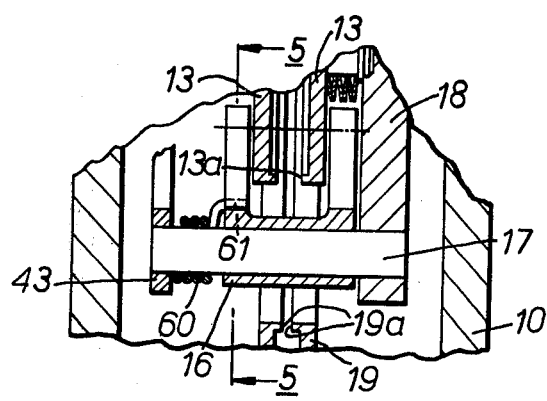
FIG. 4 is a fragmentary sectional view of a second embodiment of drive mechanism in accordance with the invention.
Figure 5:
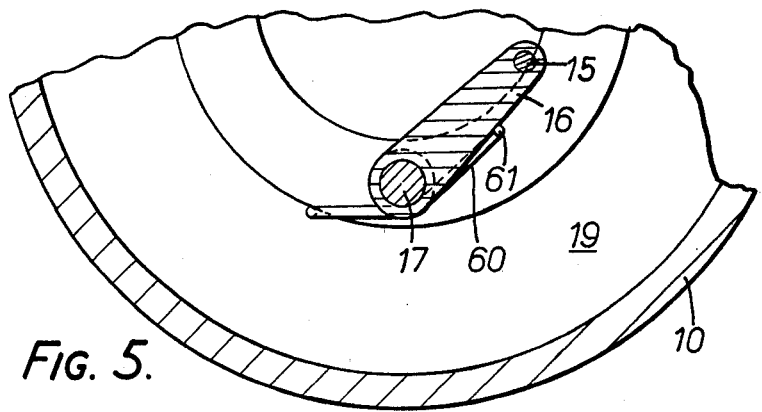
FIG. 5 is a cross-section on the line 5—5 in FIG. 4.

The drive mechanism illustrated in FIGS. 1 and 2 embodies the principles set out in the afore-mentioned Patent specification No. 469,909 and is similar in many respects to the arrangement illustrated in FIGS. 3 and 4 of this prior patent specification. Accordingly, its structure will be detailed here only to an extent necessary to assist in more fully appreciating the nature of the improvements afforded by the present invention.

A two part drive input shaft 12 is supported in suitable bearings 31, 32 in casing 10 and has a pair of sun discs 13 slidably but irrotationally mounted thereon, each sun disc being mounted on respective sliding portions 12a, 12b of the drive shaft. The sun discs are provided at their outer peripheries with opposed inwardly directed part conical or part toroidal lips 13a which bear frictionally against the opposite conical faces of three equi-angularly spaced convex planet discs 14. Planet discs 14 are rotatably mounted on respective shafts 15 each of which is carried in turn by one end of a fork or pair of arms 16. The other end of each pair of arms 16 is pivotally supported for limited swinging movement on a pin 17 mounted to a carrier member 18, which is rotatably and slidably supported on shaft portion 12b, and to a ring member 43 supported in a bearing 44 in housing 10. Planet discs 14 also protrude between opposed annular lips 19a of a pair of rotationally immobile annular members 19 which are coaxial with shaft 12. One of these is fixed to casing 10 while the other is capable of sliding movement, limited by engagement of a lug 41 on the housing within a recess 42 in the annular member, towards or away from the fixed annular member in a direction parallel to the axis of input shaft 12. Such movement is effected by hydraulic (or other) means communicating with a chamber 40 at the other end of the movable annular member.

Whilst the drive is in motion the sun discs 13 rotate with the input shaft 12 and are biased together (by means to be described). Through lips 13a, they thus impart a motion to the planet discs 14. The planet discs are centrifugally biased about pins 17 into frictional engagement with the lips 19a of the non rotating annular members 19 and are thereby caused to revolve around an axis coaxial with the input shaft, in a plane normal to the input shaft, at a speed lower than that of the input shaft and in the same direction. The motion of the planet discs is transferred as rotational motion to the carrier member 18.

The ratio between the speed of the drive shaft 12 and the carrier 18 is governed by the radial position of the planet discs 14 with respect to the sun discs 13 and the annular members 19. When the spacing between the annular members is increased to allow the planet discs to move centrifugally further radially outwardly, the reduction of speed is greater. The planet discs are mounted in such a way on shafts 15 that they are capable of limited sliding movement along their axis of rotation so that at all times during such radial movement they remain normal to their axis of rotation.

When the centres of the planet discs 14 are close to the annular members 19 and the peripheries of the sun discs 13 are close to the peripheries of the planet discs 14 there is a maximum reduction in speed between input shaft 12 and carrier member 18 whilst the minimum reduction is obtained in the reverse position.

In accordance with the first aspect of the invention, means is provided to reduce the axial forces, between planet discs 14 and lips 19a of annular members 19. These forces arise in turn from the centrifugal forces acting on the planet discs and can be excessively high at higher output or carrier member speeds. Such means is constituted by respective counterweights 50 fitted to the arms 16 on which the planet discs are mounted, so that the centrifugal forces acting on the disc/arm assemblies is fully or partially balanced about the pins 17 by the counterweights.

The drive mechanism made up of shaft 12, sun discs 13, planet discs 14, annular members 19 and carrier member 18 is coupled to an epicyclic gear train 52. More particularly, carrier member 18 has a sun gear 20 of the train mounted thereon which in turn meshes with a set of three planet gears 21. Gears 21 are mounted on respective shafts 22 rotatable in bearings 23 which are in turn carried by bushes 47 of a disc cage 24 secured to the remote end of input shaft portion 12b. The other ends of shafts 22 carry gears 25 of a further set of planet gears which mesh with an output sun gear 26 carried on an output shaft 27 in turn supported in bearings 28 in housing 10. Gears 21 and 25 are fixed to shafts 22 to rotate therewith. Thrust bearings 30 are provided at the end of bearings 23 and bushes 47 adjacent outer planet gears 25 and shoulders 48 on bushes 47 afford a surface for transferring thrust to disc cage 24. In accordance with a preferred practice of the second aspect of the invention, the gears 25 and 26 are helical and arranged so that as the torque on the output shaft 27 increases the gears 25 are forced against thrust bearings 30 and the resultant axial force is transferred through bushes 47, disc cage 24 and the inner sliding portion 12b of input shaft 12 to the corresponding sun disc 13, thus providing an increased axial loading through the sun discs 13 to the planet discs 14. The greater the torque the greater is the axial loading on the sun discs. Thus the provision of helical gears in the epicyclic gear train provides a torque sensitive axial loading on the sun discs.

In an alternative arrangement, the gears 20, 21 rather than gears 25, 26 may be helical to provide, by way of appropriate thrust transfer surfaces, the necessary torque sensitive axial loading.

FIGS. 4 to 8 depict various other arrangements, alternative to the counterweights 50 of the first described embodiment, for achieving a reduction in the centrifugally induced axial force at the interfaces between the planet discs 14 and the non-rotating annular lips 19a. In the arrangement shown in FIGS. 4 and 5 a rat trap type coil spring 60 is mounted on each of the pins 17 on which the arms 16 carrying the planet discs are mounted. One end of each coil is anchored to the associated pin whilst the other end 61 projects from the pin, is inturned and fixed to one of the arms 16 so that the centrifugal force acting on the planet disc 14 supported by that arm is resisted by the spring. The strength of the spring may be such that it either partially or fully counterbalances the action of the centrifugal forces.

Figure 7:
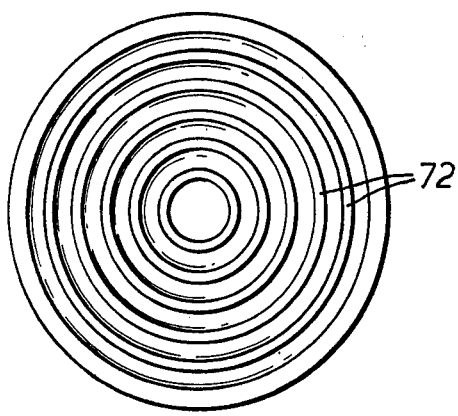
FIG. 7 is a cross-section on the line 7—7 in FIG. 6.
Figure 6:
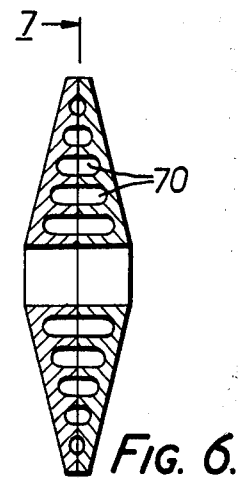
FIG. 6 is a cross-sectional view of an alternative form of planet disc.

As shown somewhat schematically in FIGS. 6 and 7 of the drawings, the planet discs may be formed with an included cone angle chosen to minimize the axial forces at the outer disc/lip interfaces on the basis that these forces are reduced in inverse proportion to the sine of half the included cone angle. To obviate the greater weight of the discs resulting from increasing the cone angle, which increased weight could offset the advantage resulting from the greater cone angle, the discs may be hollowed out as shown in FIG. 6 by way of annular cavities 70. Such discs may be made in two conical parts, the inner face of each part being provided with a series of circular grooves 72 as shown in FIG. 7 so that when the two parts are mated together the corresponding grooves 72 combine to form the cavities 70. The grooves may be of spiral or radial configuration if desired.

Figure 8:
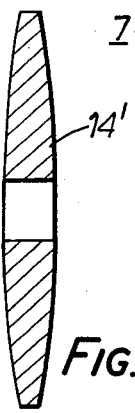
FIG. 8 is a cross-sectional view of a still further alternative form of planet disc.

In accordance with a still further alternative, the planet discs may be shaped so that their major faces are inclined at an instantaneous angle to their respective axis of rotation which angle diminishes with increasing radius. This configuration of disc is shown in FIG. 8 at 14'. The advantage of this design lies in the fact that the axial force acting between the planet discs and the non-rotating annular lips due to the centrifugal force acting on the planet discs can be kept substantially constant over a range of operating speeds or conditions.

We claim:

1. In an infinitely variable speed epicyclic drive mechanism coupled to an epicyclic gear train and comprising:

a pair of sun discs mounted on a shaft for rotation therewith, at least one of said discs being capable of limited axial movement along the shaft and being, at least when the drive mechanism is in operation, loaded towards the other disc;

a plurality of planet discs carried by a carrier member which is in turn mounted for rotation about an axis coaxial with the axis of rotation of said shaft, the planet discs being individually rotatable about a respective axis substantially parallel to said shaft and being movable, on said rotation of the carrier member, in a plane normal to the axis of said shaft;

a pair of spaced non-rotating annular members substantially coplanar with and concentric with said sun discs, an inner periphery of said annular members and an outer periphery of said sun discs embracing and frictionally engaging said planet discs at least when the drive mechanism is in operation; and means operable to vary the radial position of said planet discs with respect to said annular members and said sun discs;

the improvement wherein said loading of one of the sun discs towards the other is achieved by way of intermeshing helical sun and planet gears in said epicyclic gear train, said loading being transmitted to said sun discs by way of a cage member which is mounted on said shaft in contact with said one sun disc and carries said helical planet gears.

2. In an infinitely variable speed epicyclic drive mechanism comprising:

a pair of sun discs mounted on a shaft for rotation therewith, at least one of said discs being capable of limited axial movement along the shaft and being, at least when the drive mechanism is in operation, loaded towards the other disc;

a plurality of planet discs carried by a carrier member which is in turn mounted for rotation about an axis coaxial with the axis of rotation of said shaft, the planet discs being individually rotatable about a respective axis substantially parallel to said shaft and being movable, on said rotation of the carrier member, in a plane normal to the axis of said shaft;

a pair of spaced non-rotating annular members substantially coplanar with and concentric with said sun discs, an inner periphery of said annular members and an outer periphery of said sun discs embracing and frictionally engaging said planet discs at least when the drive mechanism is in operation; and means operable to vary the radial position of said planet discs with respect to said annular members and said sun discs;

the improvement wherein the planet discs are supported on the carrier member by being each rotatably mounted on one end of a corresponding arm or fork, the other end of which is pivotally mounted on the carrier member for movement about an axis substantially parallel to the shaft mounting the sun discs; and wherein there is further provided means for at least partially reducing centrifugally induced axial forces occurring between the planet discs and annular members at all carrier speeds and power inputs in either direction of rotation; said reducing means including springs carried by said arms or forks and acting between the carrier member and the arms or forks.

3. In an infinitely variable speed epicyclic drive mechanism coupled to an epicyclic gear train and comprising:

a pair of sun discs mounted on a shaft for rotation therewith, at least one of said discs being capable of limited axial movement along the shaft and being, at least when the drive mechanism is in operation, loaded towards the other disc;

a plurality of planet discs carried by a carrier member which is in turn mounted for rotation about an axis coaxial with the axis of rotation of said shaft, the planet discs being individually rotatable about a respective axis substantially parallel to said shaft and being movable, on said rotation of the carrier member, in a plane normal to the axis of said shaft;

a pair of spaced non-rotating annular members substantially coplanar with and concentric with said sun discs, an inner periphery of said annular members and an outer periphery of said sun discs embracing and frictionally engaging said planet discs at least when the drive mechanism is in operation; and means operable to allow variation of the radial position of said planet discs with respect to said annular members and said sun discs;

the improvement wherein said loading of one of the sun discs towards the other is achieved by way of intermeshing helical sun and planet gears in said epicyclic gear train, said loading being transmitted to said sun discs by way of a cage member which is mounted on said shaft in contact with said one sun disc and carries said helical planet gears.

4. In an infinitely variable speed epicyclic drive mechanism comprising:

a pair of sun discs mounted on a shaft for rotation therewith, at least one of said discs being capable of limited axial movement along the shaft and being, at least when the drive mechanism is in operation, loaded towards the other disc;

a plurality of planet discs carried by a carrier member which is in turn mounted for rotation about an axis coaxial with the axis of rotation of said shaft, the planet discs being individually rotatable about a respective axis substantially parallel to said shaft and being movable, on said rotation of the carrier member, in a plane normal to the axis of said shaft;

a pair of spaced non-rotating annular members substantially coplanar with and concentric with said sun discs, an inner periphery of said annular members and an outer periphery of said sun discs embracing and frictionally engaging said planet discs at least when the drive mechanism is in operation; and means operable to allow variation of the radial position of said planet discs with respect to said annular members and said sun discs;

the improvement wherein the planet discs are supported on the carrier member by being each rotatably mounted on one end of a corresponding arm or fork, the other end of which is pivotally mounted on the carrier member for movement about an axis substantially parallel to the shaft mounting the sun discs; and wherein there is further provided means for at least partially reducing centrifugally induced axial forces occurring between the planet discs and annular members at all carrier speeds and power inputs in either direction of rotation; said reducing means including springs carried by said arms or forks and acting between the carrier member and the arms or forks.

* * * * *